(12) United States Patent
Sato et al.

(10) Patent No.: US 7,575,352 B2
(45) Date of Patent: Aug. 18, 2009

(54) VEHICULAR HEADLAMP

(75) Inventors: Noriko Sato, Shizuoka (JP); Motohiro Komatsu, Shizuoka (JP); Naoki Uchida, Shizuoka (JP); Takuo Sugiyama, Shizuoka (JP); Mitsuyuki Mochizuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 12/188,860

(22) Filed: Aug. 8, 2008

(65) Prior Publication Data

US 2009/0046474 A1 Feb. 19, 2009

(30) Foreign Application Priority Data

Aug. 13, 2007 (JP) .............................. 2007-210989

(51) Int. Cl.
*F21V 33/00* (2006.01)
(52) U.S. Cl. ..................... 362/514; 362/507; 362/508; 362/511; 362/512
(58) Field of Classification Search ............ 362/508, 362/507, 511, 512, 514, 516, 538, 542
See application file for complete search history.

(56) References Cited

U.S. PATENT DOCUMENTS 3,781,538 A * 12/1973 Brudy et al. ............... 362/542
4,363,085 A * 12/1982 Demas ....................... 362/467
5,426,417 A * 6/1995 Stanuch ..................... 340/473
5,580,151 A * 12/1996 Chen ......................... 362/549
5,658,069 A * 8/1997 Alonzo et al. .............. 362/237
5,697,691 A * 12/1997 Menke ........................ 362/35
6,607,294 B2 8/2003 Taniuchi
6,969,183 B2 11/2005 Okubo et al.

* cited by examiner

*Primary Examiner*—Laura Tso
(74) *Attorney, Agent, or Firm*—Osha • Liang LLP

(57) ABSTRACT

A vehicular headlamp includes at least one a light source irradiating visible light and a lens allowing the visible light from the light source to pass through to forward of a vehicle. The light source and the lens are mounted in a rotating element. Alternatively, the vehicular headlamp includes at least one a light source irradiating visible light, and a mirror mounted on a rotating element and arranged to reflect the visible light from the at least one light source to forward of a vehicle. The vehicular headlamp also includes a scanning actuator for reciprocatingly rotating the rotating element so as to form a light distribution pattern forward of the vehicle and a light distribution control portion for controlling the scanning actuator such that a portion of the light distribution pattern is relatively bright.

20 Claims, 18 Drawing Sheets

VEHICULAR HEADLAMP

BACKGROUND OF INVENTION

1. Field of the Invention

The present invention relates to a vehicular headlamp that forms a variable light distribution pattern forward of a vehicle.

2. Related Art

Art for changing a light distribution pattern forward of a vehicle by driving an optical part in a lamp chamber is known. For example, Patent Document 1 discloses a vehicular headlamp that irradiates light from a light source to a paraboloidal reflective surface via a shielding plate and deflects a portion of luminous flux by driving a movable mirror on an optical path ahead of the paraboloidal reflective surface so as to change the light distribution pattern.

Patent Document 2 discloses a vehicular headlamp in which a reflective surface that reflects light from a light source is structured from a number of micro mirror elements. In addition, an on/off state of the mirror elements, an intensity gradation and a tilt angle are digitally controlled separately so as to form a light distribution pattern with a difference in brightness forward of a vehicle.

[Patent Document 1] Examined Patent Application Publication No. 3508926

[Patent Document 2] Japanese Patent Application Laid-Open (Kokai) No. 2004-210125

SUMMARY OF INVENTION

However, according to the vehicular headlamp of Patent Document 1, in order to form a basic light distribution pattern, the optical part must be separate from the movable mirror. Therefore, there is a disadvantage in that the structure is complicated and large. In addition, the deflection effect from the movable mirror is limited to a portion of the luminous flux toward the front of the vehicle. Therefore, a problem arises because the light distribution pattern has a narrow variable range.

According to the vehicular headlamp of Patent Document 2, the plurality of mirror elements are separately controlled so as to change the light distribution patterns in a diverse manner. However, the use of an expensive system is required to control the mirror elements. In addition, the light use efficiency is poor. For example, light may leak from gaps between the elements, or reflective light from the turned-off elements may be absorbed by an absorber. Therefore, a problem arises because a large light source is required, especially for a vehicular light distribution pattern demanding a clear difference in brightness.

One or more embodiments of the present invention to provide a vehicular headlamp that has a simple, compact, low-cost structure and forms various light distribution patterns having a difference in brightness with good light efficiency.

In one or more embodiments, a vehicular headlamp according to the present invention is characterized by including: a light source irradiating visible light; a lens allowing the visible light from the light source to pass through to forward of a vehicle; a scanning actuator reciprocatingly rotating at high speed a rotating element in which the light source and the lens are mounted so as to form a light distribution pattern forward of the vehicle; and light distribution control means for controlling the scanning actuator such that a portion of the light distribution pattern is relatively bright.

The type of light source is not particularly limited, and an LED light source or a laser light source, for example, may be used. A plurality of light sources with different brightness may be arranged on the rotating element of the scanning actuator. A plastic lightweight lens is preferably used as the lens. A one-axis actuator driving the rotating element around one axis or a two-axis actuator driving the rotating element around two orthogonal axes may be used as the scanning actuator. The speed of the rotating element is not particularly limited, but is preferably a speed that enables surface emission of an irradiated area visible with the naked eye.

One or more embodiments of the present invention provide a vehicular headlamp capable of driving the rotating element at higher speed. The vehicular headlamp is characterized by including: a light source irradiating visible light; a mirror reflecting the visible light from the light source to forward of a vehicle; a scanning actuator reciprocatingly rotating at high speed a rotating element in which the mirror is mounted so as to form a light distribution pattern forward of the vehicle; and light distribution control means for controlling the scanning actuator such that a portion of the light distribution pattern is relatively bright.

The mirror includes a reflective surface formed from a single plane or a curved surface that reflects all visible light from the light source. The mirror is processed as a thin film on a surface of the rotating element by metal sputtering or etching so as to reduce the mass of the rotating element and increase an operating speed. The shape of the mirror may be selected as appropriate according to the light distribution pattern. For example, the mirror may be formed into a horizontally long shape for a horizontally long light distribution pattern. In addition, the mirror may be formed into a vertically long shape for a vertically long light distribution pattern.

In the above vehicular headlamp, the light distribution control means controls the movement (angle and speed) of the rotating element and changes a scanning direction and a range of the basic pattern so as to provide the light distribution pattern with a difference in brightness. Specifically, the light distribution control means relatively illuminates the vicinity of the cut-off line of the light distribution pattern for the better distant visibility. In addition, the light distribution control means relatively illuminates the vicinity of the horizontally centered portion of the light distribution pattern. Accordingly, a light distribution pattern with high forward visibility, which is appropriate for a vehicle, can be formed.

In addition, the vehicular headlamp one or more embodiments of the present invention is characterized in that the light distribution control means includes an actuator control portion for controlling the scanning actuator and a light source control portion for controlling a light output of the light source during a stroke of the rotating element. The control of the light output includes an on/off (turning-on/turning-off) control of the light source and a light adjustment, or the like. The light output of the light source is controlled during the stroke of the rotating element so as to optically divide the light distribution pattern into a plurality of sections. For example, a non-illuminated section or a darkened section is set in the light distribution pattern so as to prevent a vehicle and a pedestrian included in the irradiated area from being dazzled.

Furthermore, one or more embodiments of the present invention provide a vehicular headlamp in which a plurality of light sources is combined on a mirror. The vehicular headlamp is characterized by including: a plurality of light sources irradiating visible light; a mirror reflecting the visible light from the light sources to forward of a vehicle; a scanning actuator reciprocatingly rotating at high speed a rotating element in which the mirror is mounted so as to form a light distribution pattern forward of the vehicle; and light distribution control means for controlling such that a portion of the light distribution pattern is relatively bright, wherein the light distribution control means includes an actuator control portion for controlling the scanning actuator and a light source control portion for controlling a light output of the plurality of the light sources.

According to a vehicular headlamp one or more embodiments of the present invention, a light source or a mirror is mounted on a rotating element of a scanning actuator. Accordingly, when the rotating element reciprocatingly rotates, light from the light source is scanned at high speed ahead of a vehicle. Therefore, an effect is obtained in which various light distribution patterns with a difference in brightness can be formed with good light efficiency with a simple, compact, and low-cost structure.

Other aspects and advantages of the invention will be apparent from the following description, the drawings and the claims.

DETAILED DESCRIPTION

Figure 17:
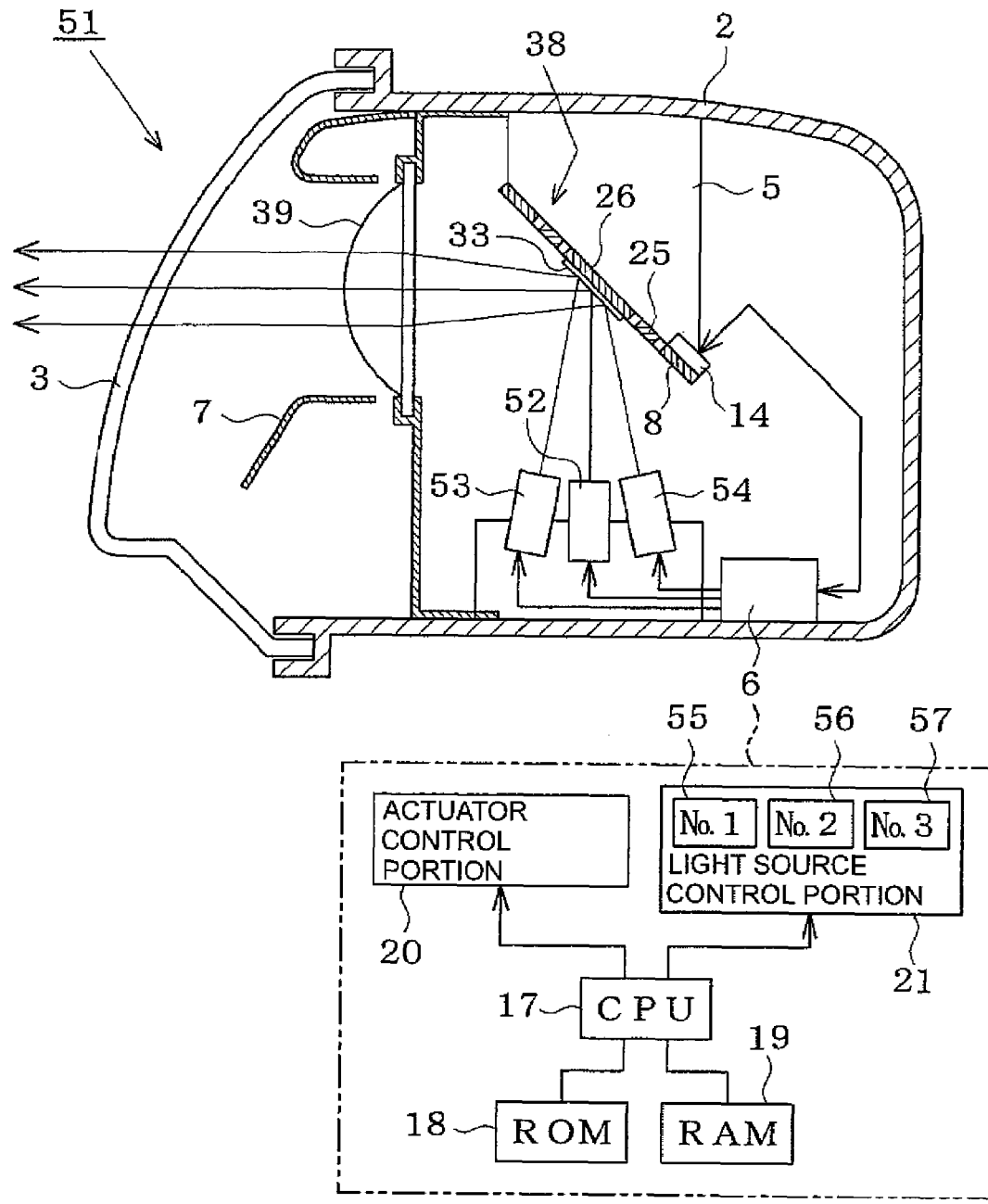
FIG. 17 is a cross-sectional view showing a vehicular headlamp according to a third embodiment of the present invention.
Figure 18:
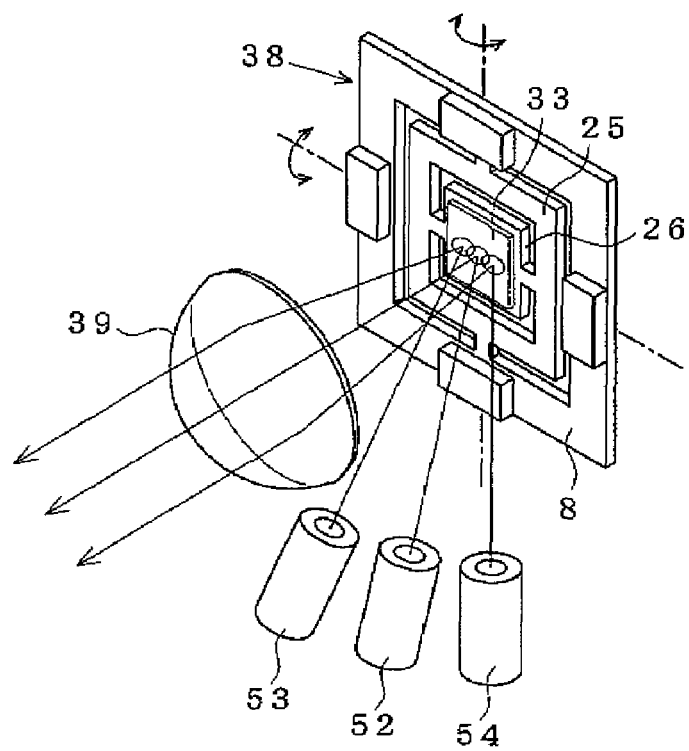
FIG. 18 shows model representations of a light distribution pattern formed by a plurality of light sources.
Figure 18:
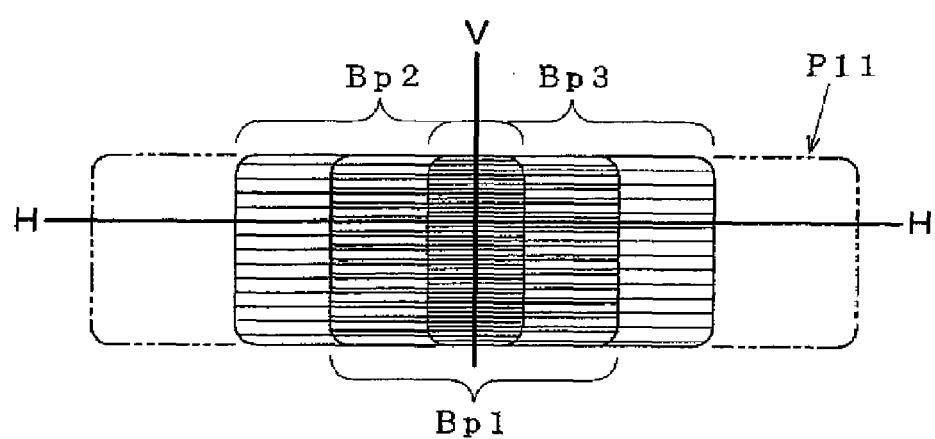

Hereinafter, embodiments of the present invention will be described with reference to the drawings. FIGS. 1 to 7 show a vehicular headlamp 1 of a first embodiment in which a rotating element of a scanning actuator is provided with a light source and a lens. FIGS. 8 to 16 show a vehicular headlamp 31 of a second embodiment in which a rotating element is provided with a mirror. FIGS. 17 and 18 show a vehicular headlamp 51 of a third embodiment in which a plurality of light sources is combined with a mirror on a rotating element. In these figures, like reference numerals indicates members with an equivalent function.

First Embodiment

Figure 1:
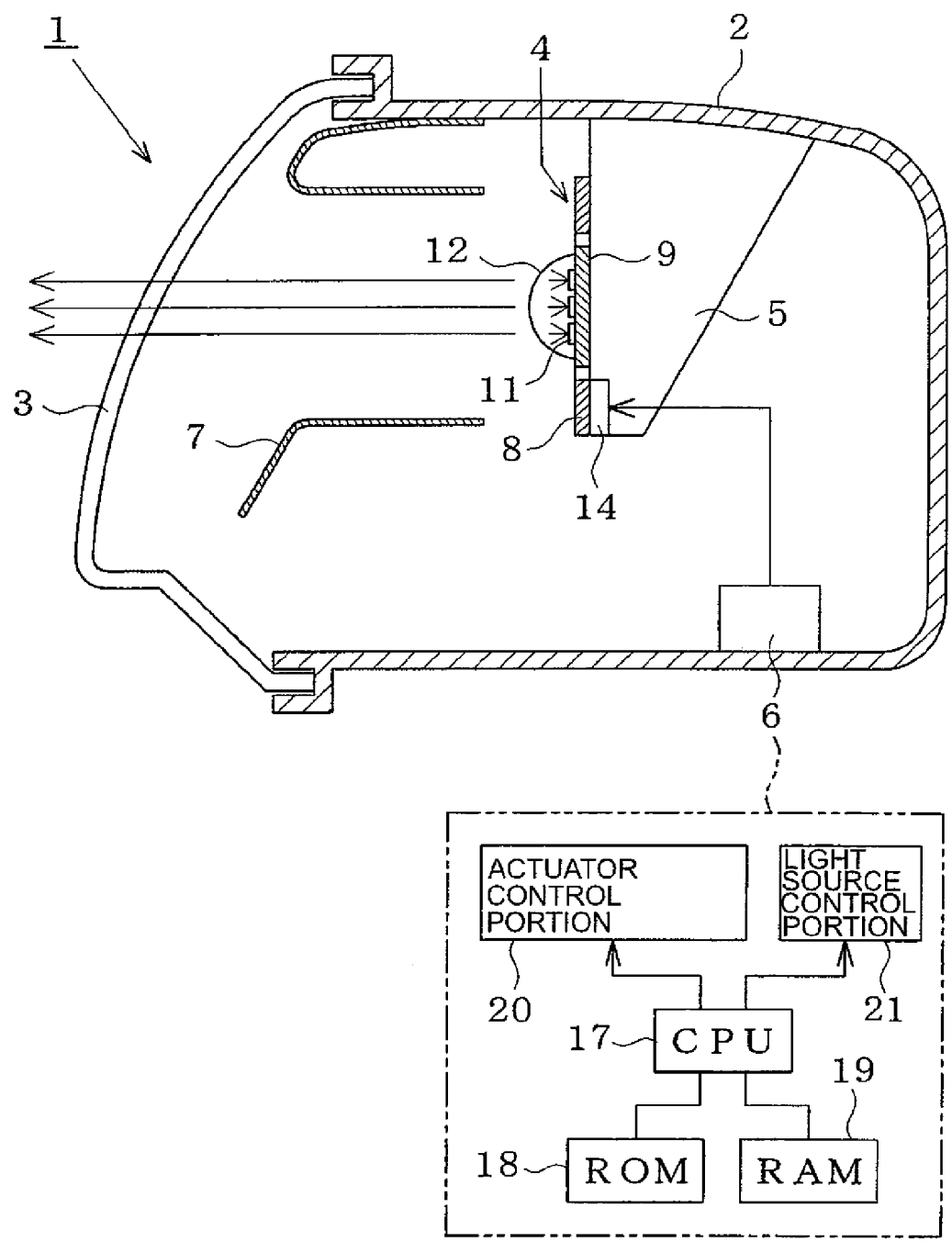
FIG. 1 is a cross-sectional view showing a vehicular headlamp according to a first embodiment of the present invention.

As shown in FIG. 1, the vehicular headlamp 1 of the first embodiment includes a housing 2 disposed on both left and right sides of a vehicle body front portion. A front surface of the housing 2 is covered by a translucent cover 3. A scanning actuator 4 is attached by a bracket 5 to a generally center portion of the housing 2. A control unit 6 is disposed in a bottom portion of the housing 2. An extension 7 is disposed between the scanning actuator 4 and the translucent cover 3.

Figure 2:
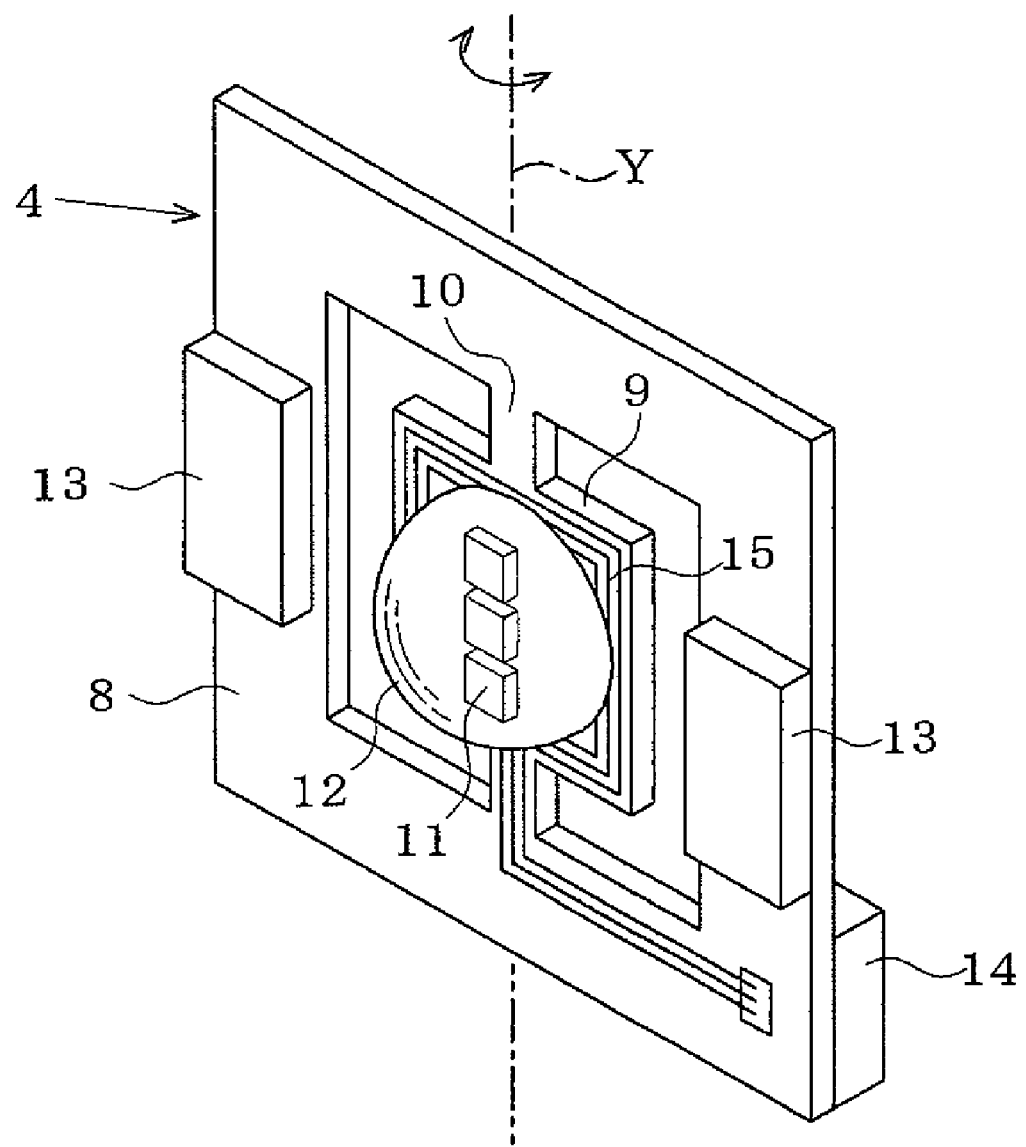
FIG. 2 is a perspective view showing a scanning actuator with a one-axis driving system.

As shown in FIG. 2, the scanning actuator 4 has a rotating element 9, which is shaped as a flat plate, inside a quadrangular ring-like base 8. The base 8 is fixedly held by the bracket 5. The rotating element 9 is connected to the base 8 so as to reciprocatingly rotate in the right-left direction by a torsion bar 10 in a vertical axis (Y) direction. A light source 11 radiating visible light and a lens 12 allowing the visible light radiated from the light source 11 to pass therethrough to forward of the vehicle are mounted on a front surface of the rotating element 9. The light source 11 is formed from a plurality of LEDs arranged in the up-down direction. A compact and lightweight lens made of plastic is used as the lens 12.

The base 8 is provided with a pair of permanent magnets 13 and a terminal portion 14. A wiring portion 15 including a drive coil and a power supply wire for a light source is formed in the rotating element 9. The permanent magnet 13 forms a magnetic field in a direction perpendicular to the torsion bar 10 and controls the magnitude and the direction of a current flowing through the drive coil. Accordingly, a rotational torque generated by the Lorentz force acts on the rotating element 9. The scanning actuator 4 is structured so as to reciprocatingly rotate the rotating element 9 at high speed against a restoring force of the torsion bar 10, scan light from the light source 11 ahead of the vehicle, and then form a required light distribution pattern.

As shown in FIG. 1, a CPU 17, a ROM 18, and a RAM 19 are disposed in the control unit 6. The control unit 6 is also provided with an actuator control portion 20 controlling a drive current of the scanning actuator 4 and a light source control portion 21 controlling light output from the light source 11. The ROM 18 stores a plurality of light distribution control programs. Based on a selectively read light distribution control program, the CPU 17 outputs an operation instruction to the actuator control portion 20 and the light source control portion 21, which respectively control illumination of a portion of the light distribution pattern.

Figure 3:
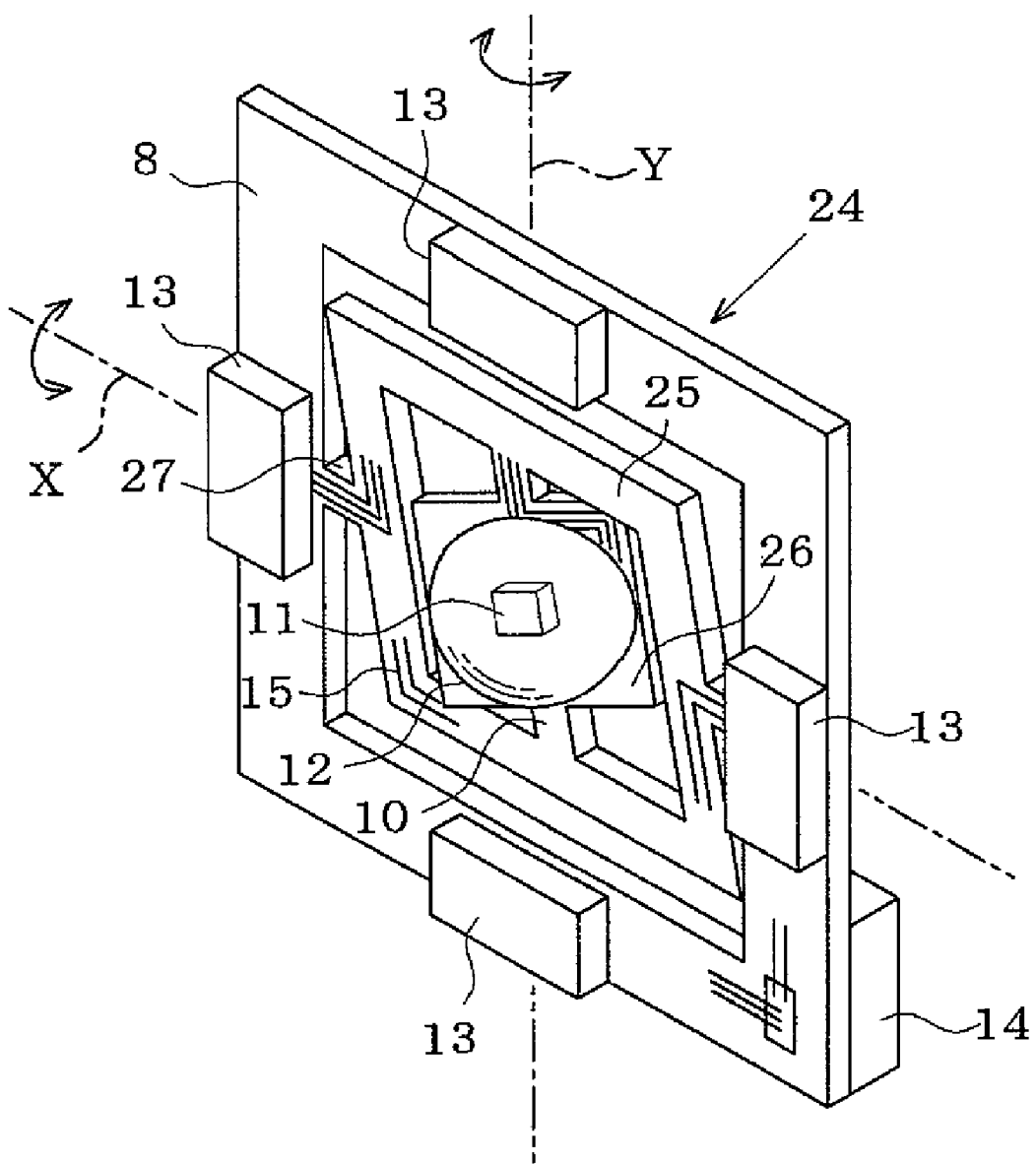
FIG. 3 is a perspective view showing a scanning actuator with a two-axis driving system.

Note that a scanning actuator 24 with a two-axis driving system as shown in FIG. 3 may be used in place of the scanning actuator 4 with a one-axis driving system as shown in FIG. 2. The two-axis actuator 24 includes inside and outside rotating elements 25, 26 inside the base 8. The outside rotating element 25 is connected to the base 8 so as to reciprocatingly rotate in the up-down direction by a torsion bar 27 in a horizontal axis (X) direction. The inside rotating element 26 is connected to the outside rotating element 25 so as to reciprocatingly rotate in the right-left direction by the torsion bar 10 in a vertical axis (Y) direction.

The light source 11 formed from an LED and the lens 12 are mounted on a front surface of the inside rotating element 26. The base 8 is provided with four permanent magnets 13. The permanent magnet 13 forms a magnetic field in a direction perpendicular to the torsion bars 10, 27. The actuator control portion 20 controls the magnitude and direction of a current flowing through the drive coil of the wiring portion 15. In addition, a torque by the Lorentz force acts on the rotating elements 25, 26. The rotating elements 25, 26 are reciprocatingly rotated at high speed against the restoring force of the torsion bars 10, 27. Light from the light source 11 is scanned ahead of the vehicle in the directions of the orthogonal axes. Accordingly, the required light distribution pattern is formed.

Figure 4:
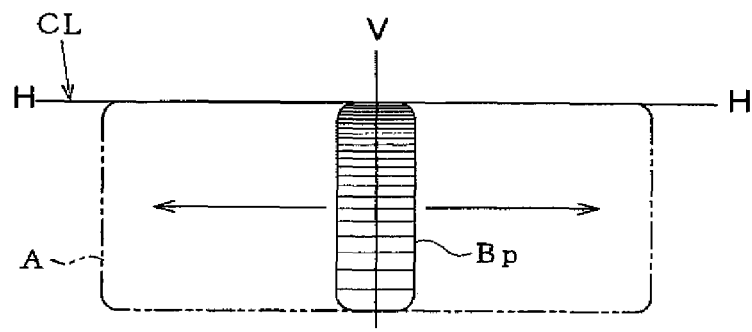
FIG. 4 shows model representations of a light distribution pattern which is bright in the vicinity of a cut-off line.
Figure 4:
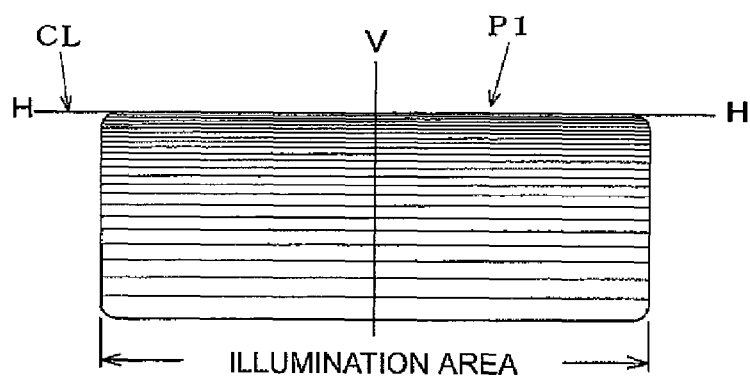
Figure 4:
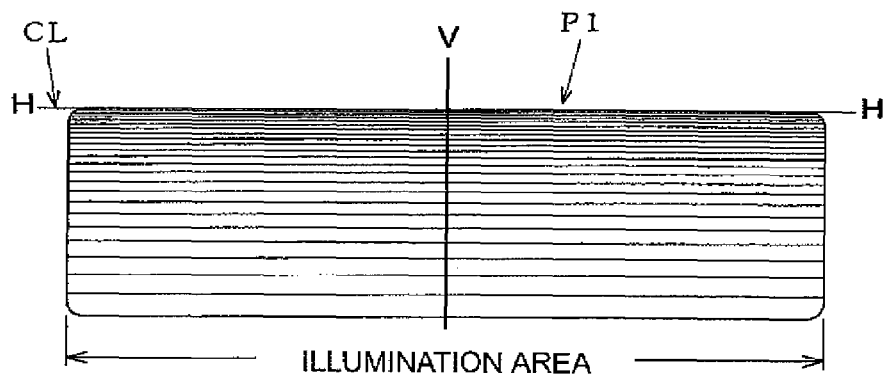

Next, an operation of the vehicular headlamp 1 will be described with reference to examples of the light distribution pattern. FIG. 4 shows a light distribution pattern P1 formed by the scanning actuator 4 with the one-axis driving system. When the headlamp 1 is powered on, the light source control portion 21 controls such that LEDs positioned more towards an upper side of the rotating element 9 are more brightly lit. Visible light from the light source 11 is formed by the lens 12 into parallel light and irradiated ahead of the vehicle. When the scanning actuator 4 is stopped, a vertically long basic pattern Bp, which is brighter on an upper end side, is formed at a horizontally centered portion of an irradiated area A, as shown in FIG. 4(a).

When the scanning actuator 4 is driven, the rotating element 9 reciprocatingly rotates in the right-left direction at an angle and a speed controlled by the actuator control portion 20. The basic pattern Bp is scanned in a horizontal direction (H-H) at high speed. As shown in FIG. 4(b), this causes surface emission of the irradiated area A to be visible with the naked eye. Accordingly, the light distribution pattern P1 is formed with the vicinity of a cut-off line CL relatively brightly illuminated and better distant visibility. A length of the light distribution pattern P1 (illumination range) in the horizontal direction may be freely adjusted by changing an operation range (maximum angle) of the rotating element 9. Therefore, the relatively narrow and condensed type pattern as shown FIG. 4(b) or the relatively wide and diffused type pattern as shown FIG. 4(c) may be easily formed.

Figure 5:
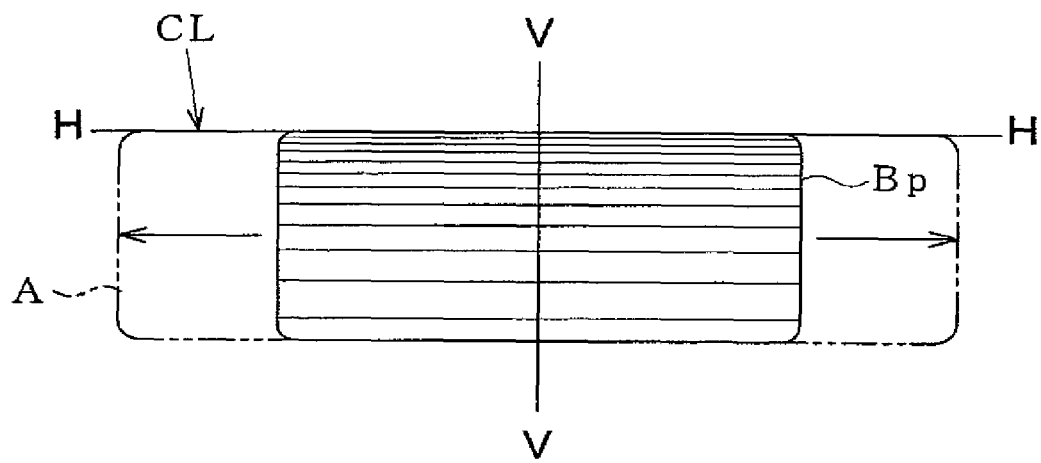
FIG. 5 shows model representations of a light distribution pattern which is bright in the vicinity of the horizontally centered portion.
Figure 5:
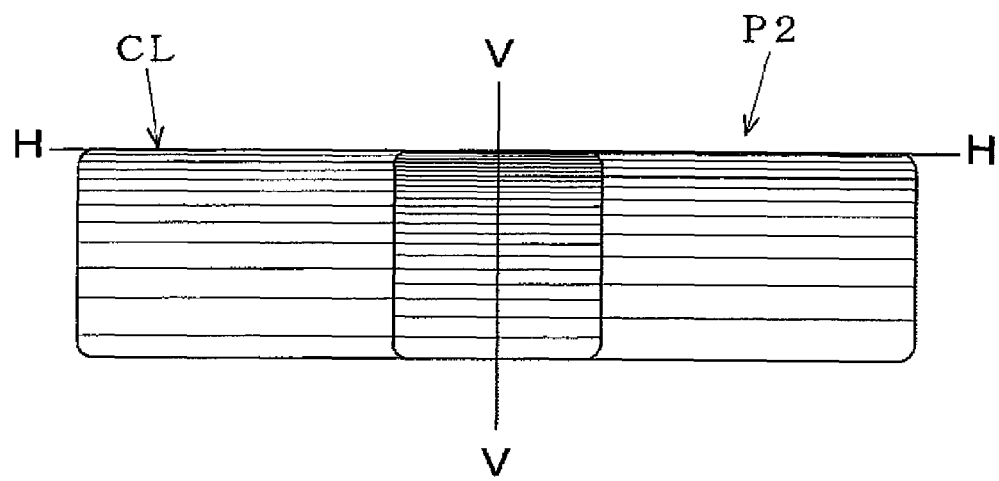

FIG. 5 shows a light distribution pattern P2 which is bright in the vicinity of the center portion in the horizontal direction. As shown in FIG. 5(a), the scanning actuator 4 forms the horizontally long basic pattern Bp, in which the light source 11 is structured from a plurality of LEDs horizontally arranged, and a cylindrical lens is used as the lens 12, for example. As shown in FIG. 5(b), the actuator control portion 20 controls the operation range of the rotating element 9 so as to overlap a portion of the basic pattern Bp. In addition, when the rotating element 9 reciprocatingly rotates, the basic pattern Bp is scanned at high speed. Furthermore, the vicinity of the horizontally centered portion of the light distribution pattern P2 is relatively brightly illuminated. Accordingly, it is possible to easily form the light distribution pattern P2, which has a bright center portion as required for the vehicular headlamp.

Figure 6:
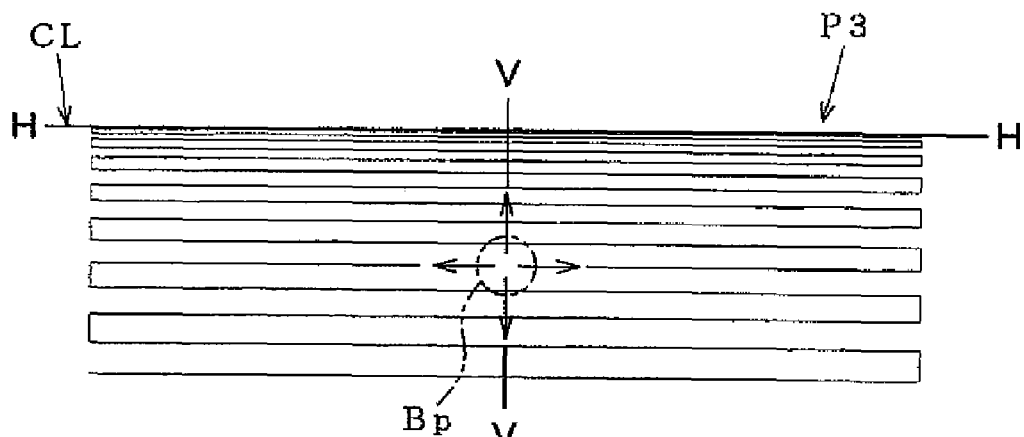
FIG. 6 shows model representations of a light distribution pattern made by a two-axis actuator.
Figure 6:
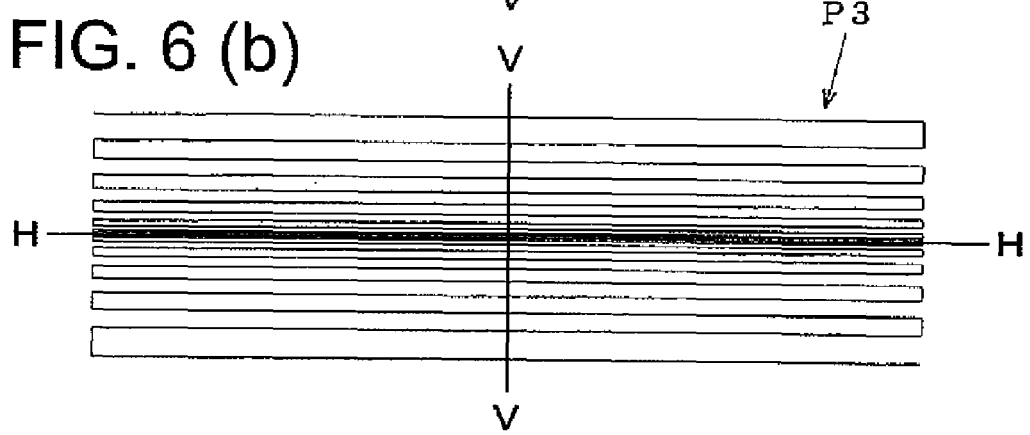
Figure 6:
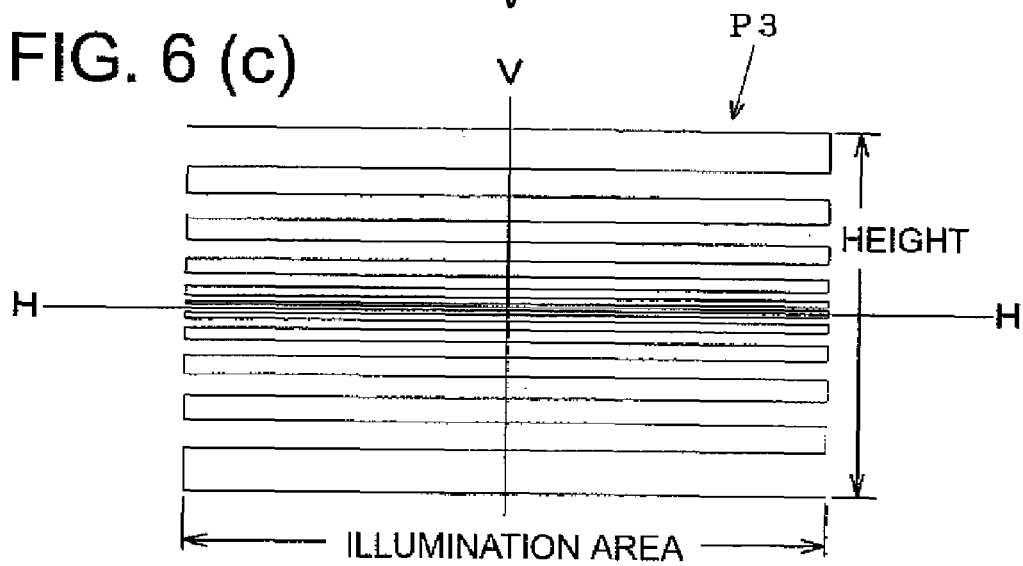

FIG. 6 shows a light distribution pattern P3 formed by the scanning actuator 24 with the two-axis driving system. In the two-axis actuator 24, the actuator control portion 20 controls an angle of the outside rotating element 25 around the vertical axis (X) and an angle of the inside rotating element 26 around the horizontal axis (Y). As shown in FIG. 6(a), when both rotating elements 25, 26 reciprocatingly rotate, the basic pattern Bp formed from a spotlight or the like is scanned at high speed in the directions of two orthogonal axes. Note that the shape of the basic pattern Bp is not limited to the example in the figure and may be changed into a vertically long or horizontally long shape or any other shape by changing the structure of the light source 11 and the lens 12.

The actuator control portion 20 controls the angle of the outside rotating element 25 around the horizontal axis such that a portion of the light distribution pattern P3 in a vertical direction (V-V) is relatively bright. For example, as shown in FIG. 6(a), the actuator control portion 20 controls such that a scanning interval of the low-beam light distribution pattern P3 is narrower on an upper side, thus making it possible to relatively brightly illuminate the vicinity of the cut-off line CL. In addition, as shown in FIG. 6(b), the light distribution pattern P3 may be changed from low beam to high beam so as to relatively brightly illuminate the vicinity of a road surface ahead of the vehicle. Furthermore, as shown in FIG. 6(c), in addition to the horizontal length (illumination range) of the light distribution pattern P3, a height (height on a screen) may be freely adjusted so as to form a number of light distribution patterns P3 depending on the weather or road conditions.

Figure 7:
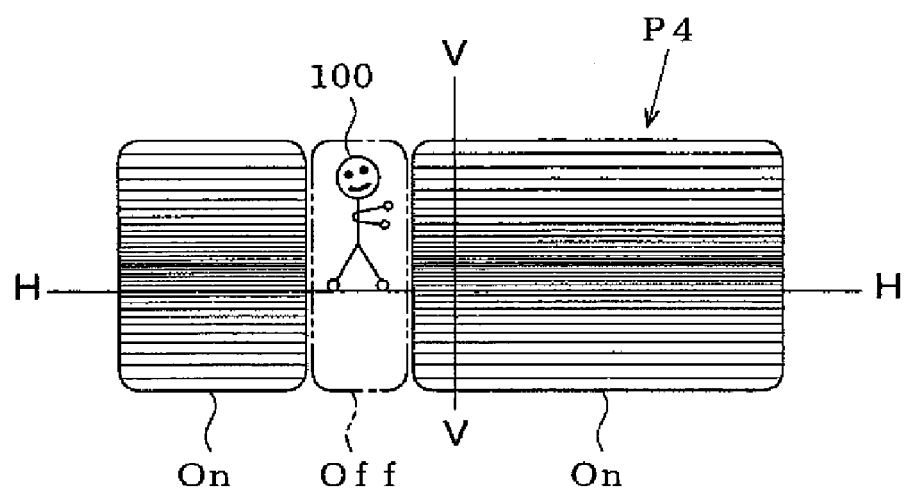
FIG. 7 shows model representations of a light distribution pattern including a non-irradiated or a darkened section.
Figure 7:
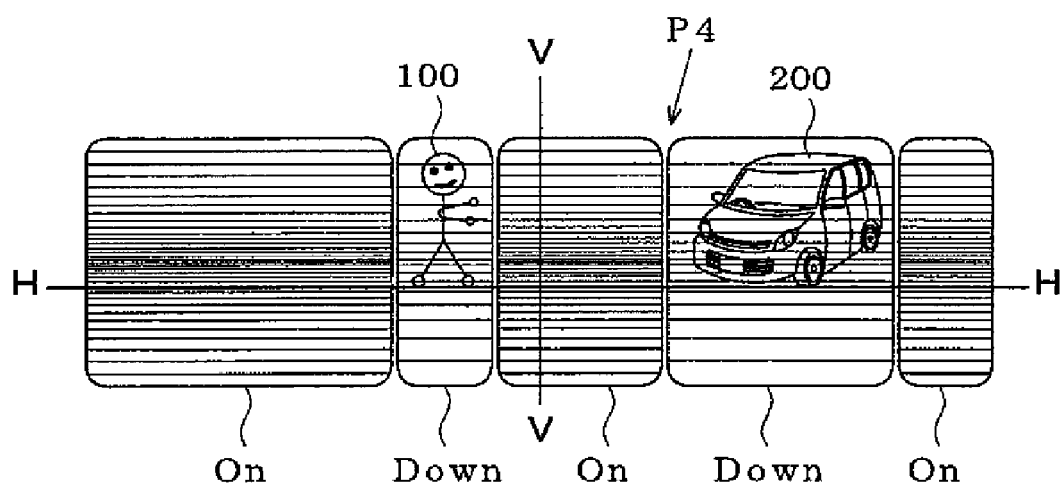

FIG. 7 shows a light distribution pattern P4 divided into a plurality of sections. The actuator control portion 20 controls the operation range, i.e., stroke, of the inside rotating element 26. In addition, the light source control portion 21 adjusts the light output from the light source 11 during the stroke of the rotating element 26 so as to divide the light distribution pattern P4 into the plurality of sections. For example, as shown in FIG. 7(a), the light distribution pattern P4 is divided into a non-illuminated section (Off) including a pedestrian 100, and an illuminated section (On) illuminating other areas. As shown in FIG. 7(b), the light distribution pattern P4 is divided into a darkened section (Down) including the pedestrian 100 and a vehicle 200, and an illuminated section (On) with normal light output.

The light source control portion 21 controls to turn off the light source 11 in the non-illuminated section (Off) and reduce the light output of the light source 11 in the darkened section (Down). Accordingly, a portion of the light distribution pattern P4 is relatively darkened so as to prevent the pedestrian 100 and a driver of the vehicle 200 from being dazzled and also to illuminate a remaining section with normal brightness. Note that when a light control section is determined according to the movement of objects, it is preferable to use a detector such as an infrared sensor in combination. When the light control section is determined in a fixed area such as an oncoming vehicle lane, some programs that includes a preset command to turn off or darken in the corresponding section may be prepared. The divided type light distribution pattern P4 may be formed by not only the two-axis actuator 24, but also, by the one-axis actuator 4. For example, the one-axis actuator 4 (see FIG. 2) may form the vertically long basic pattern Bp (see FIG. 4A(a)). In addition, during scanning of the basic pattern Bp in the horizontal direction, the light output of the light source 11 is adjusted. Accordingly, the same divided type light distribution pattern P4 as that as shown in FIG. 7 can be formed.

Second Embodiment

Figure 8:
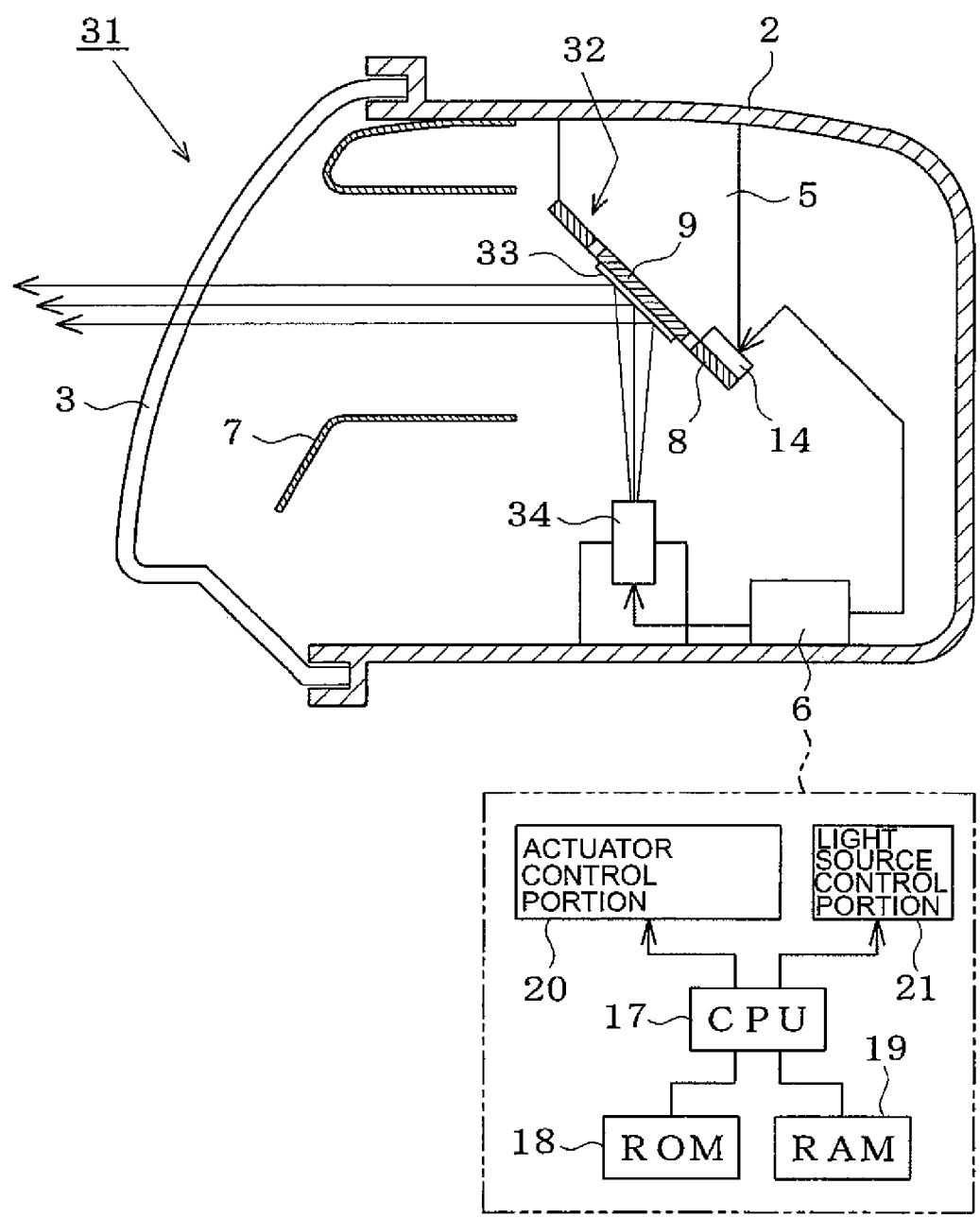
FIG. 8 is a cross-sectional view showing a vehicular headlamp according to a second embodiment of the present invention.
Figure 9:
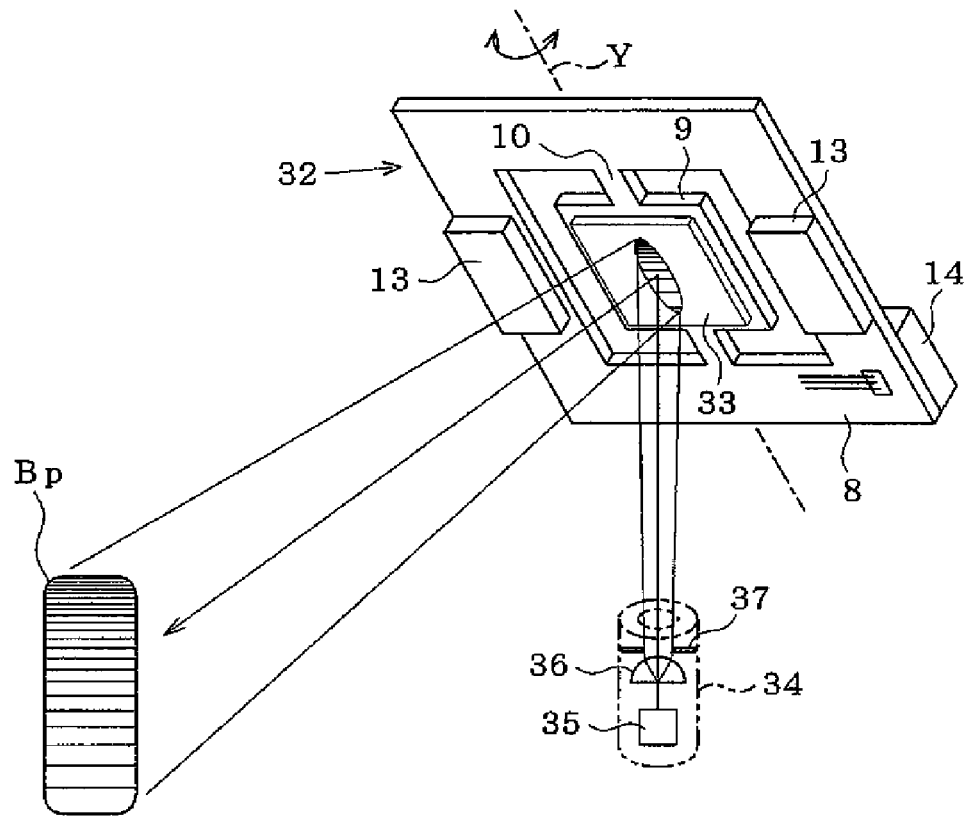
FIG. 9 shows model representations of a light distribution pattern which is bright in the vicinity of a cut-off line.
Figure 9:
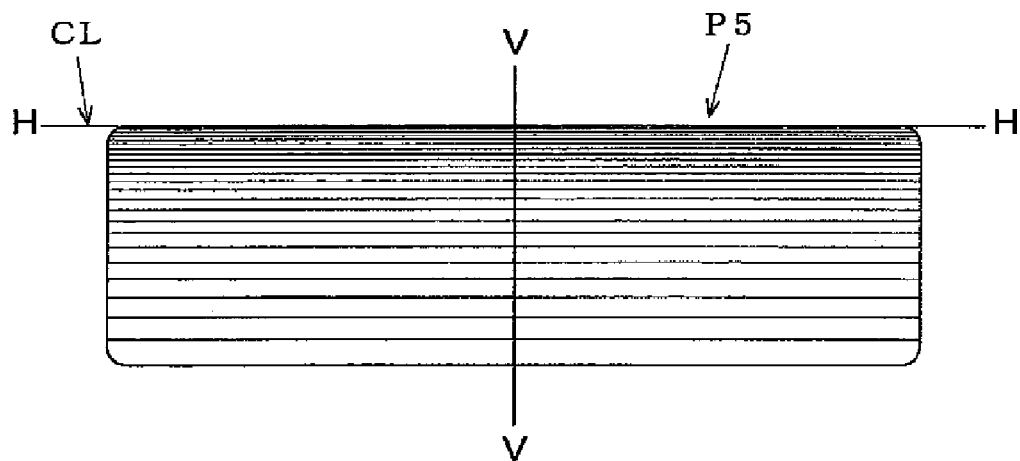

As shown in FIG. 8, in a vehicular headlamp 31 of a second embodiment, a mirror 33 is mounted on a rotating element 9 of a scanning actuator 32 and reflects visible light from a light source 34 to the front of the vehicle. The scanning actuator 32 drives the rotating element 9 around the vertical axis at high speed and scans reflective light from the mirror 33 ahead of the vehicle so as to form a required light distribution pattern. The light source 34 is disposed near the control unit 6 separately from the scanning actuator 32. In the same manner as the first embodiment the control unit 6 is structured so as to control the angle and the speed of the rotating element 9 and the light output of the light source 34 so as to relatively illuminate a portion of the light distribution pattern.

As shown in FIG. 9(a), the light source 34 includes a light emission portion 35 emitting laser light, a cylindrical lens 36 forming laser luminous flux into a required shape, and a shielding plate 37 forming an emission window for the luminous flux. The light source 34 irradiates vertically long laser light toward the mirror 33. The mirror 33 is processed as a thin film on a surface of the rotating element 9 by means such as metal sputtering, etching, and plating. The mirror 33 forms a single reflective surface that completely reflects laser light. Therefore, compared to a conventional device formed from a number of micro mirror elements, the light use efficiency is improved. Compared to the first embodiment, the mass of the rotating element 9 can be reduced, and the laser light can be scanned at a higher speed.

When the scanning actuator 32 is stopped, laser light formed into luminous flux by the light source 34 is irradiated from the mirror 33 forward of the vehicle. Accordingly, the vertically long basic pattern Bp which is brighter on an upper end side is formed at a center portion in the horizontal direction of the irradiation area. As shown in FIG. 9(b), when the scanning actuator 32 is driven, the rotating element 9 rotates reciprocatingly, and the basic pattern Bp is scanned at high speed in the horizontal direction. Accordingly, the light distribution pattern P5 is formed with the vicinity of the cut-off line CL relatively bright and better distant visibility. In the same manner as the first embodiment, the horizontal length of the light distribution pattern P5 may be freely adjusted by changing the operation range of the rotating element 9.

Figure 10:
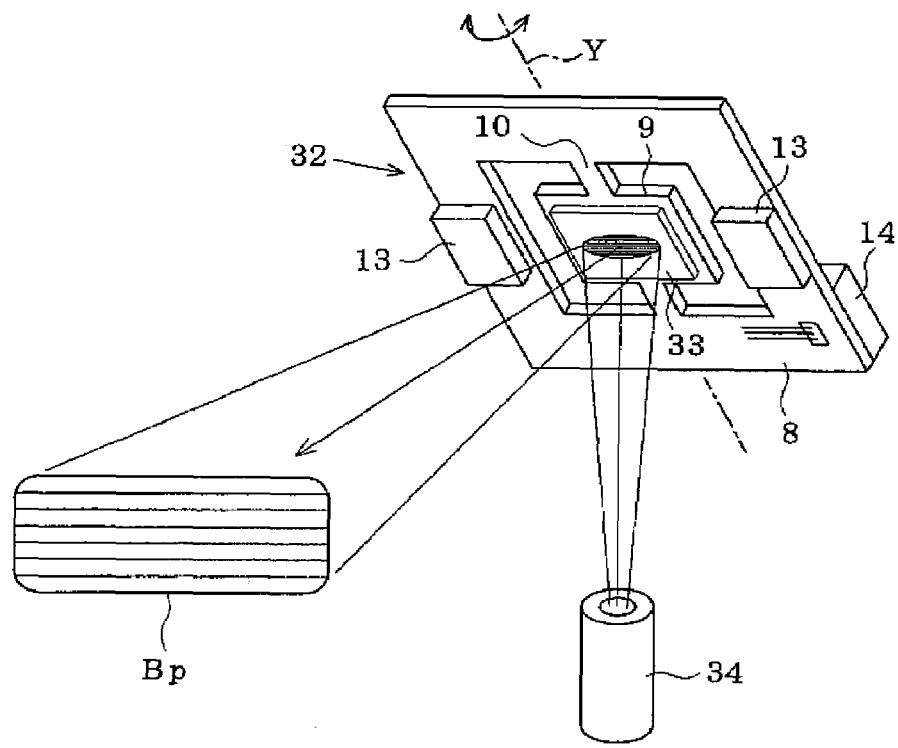
FIG. 10 shows model representations of a light distribution pattern which is bright in the vicinity of the horizontally centered portion.
Figure 10:
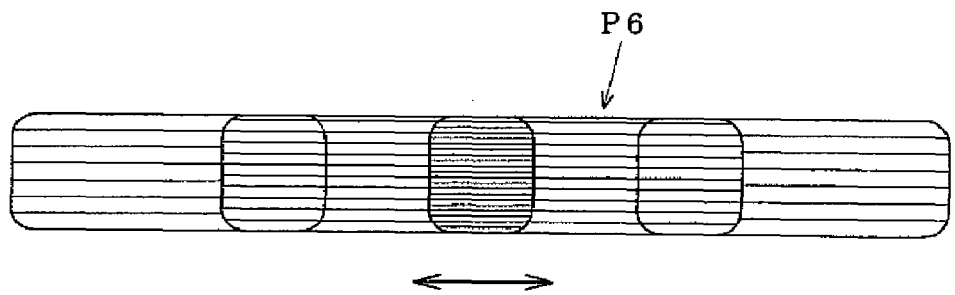

FIG. 10 shows a light distribution pattern P6, which is relatively bright in the vicinity of a center portion in the horizontal direction. Laser light formed horizontally long by the light source 34 is emitted toward the horizontally long mirror 33 so as to form the horizontally long basic pattern Bp as shown in FIG. 10(a). As shown in FIG. 10(b), the operation range of the rotating element 9 is controlled so as to overlap a portion of the basic pattern Bp. Accordingly, the light distribution pattern P6, which is brighter toward a center portion, is formed over a wide range in the horizontal direction. The stroke of the rotating element 9 is finely adjusted in cycles and the overlapping range of the basic pattern Bp is changed in a stepped manner in the horizontal direction. Accordingly, the light distribution pattern P6 is provided with an illuminance distribution with a gradient where the center portion is brightest and the left and right sides become gradually darker toward the ends. Note that the same illuminance distribution as that as shown in FIG. 9(a) may be added to the basic pattern Bp so as to form a light distribution pattern which is bright to the center portion in the horizontal direction and in the vicinity of the cut-off line.

Figure 11:
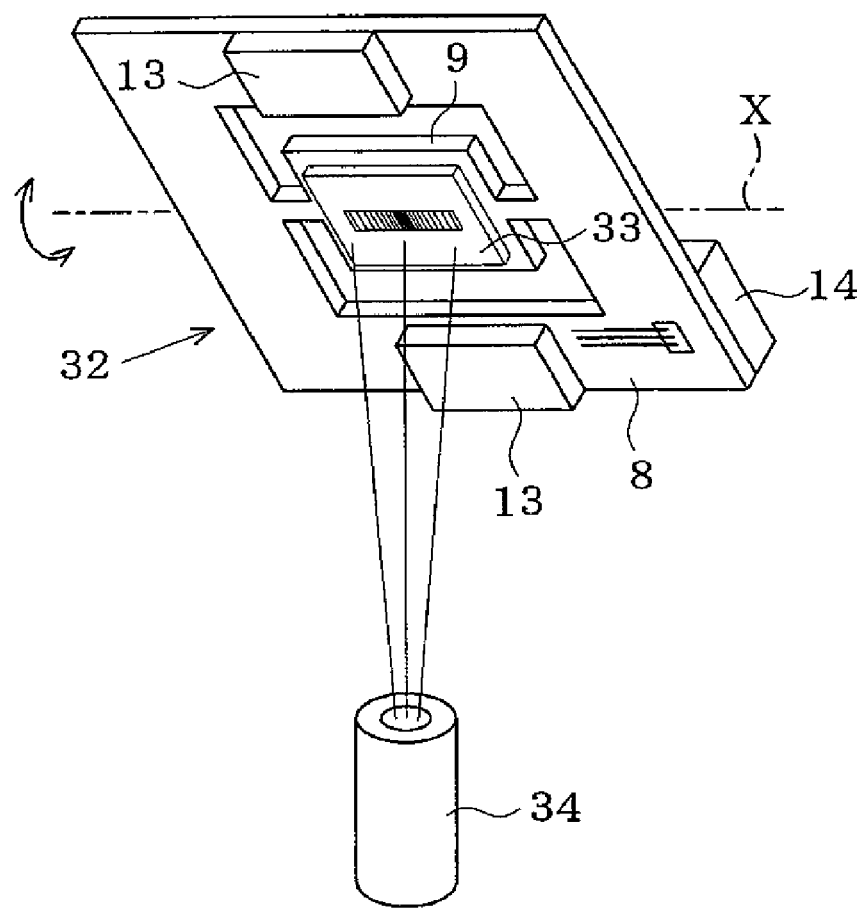
FIG. 11 shows model representations of a vertically long light distribution pattern.
Figure 11:
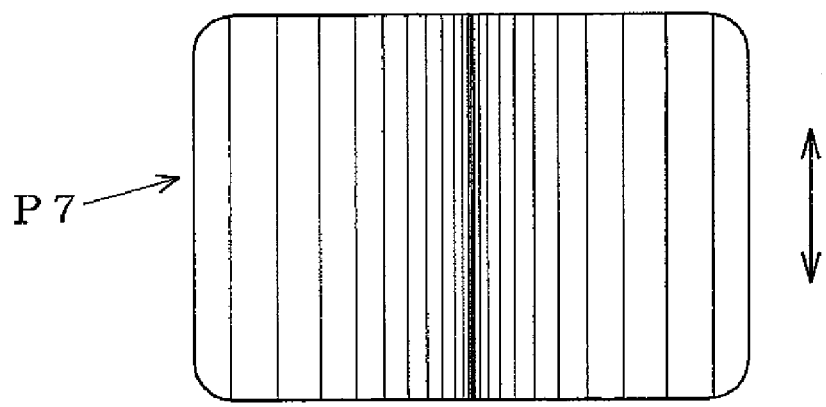

FIG. 11 shows a light distribution pattern P7 which is bright at the center portion in the horizontal direction and is relatively long in the vertical direction. As shown in FIG. 11(a), the one-axis scanning actuator 32 is laterally disposed and the rotating element 9 drives around the horizontal axis (X) in the up-down direction. The light source 34 forms horizontally long laser light which is brighter at the center portion in the longitudinal direction, which is emitted to the horizontally long mirror 33. As shown in FIG. 11(b), when the rotating element 9 reciprocatingly rotates, the light distribution pattern P7 which is brighter at the center portion and long in the vertical direction is formed over a relatively narrow range in the horizontal direction. The height of the light distribution pattern P7 (height on a screen) may be freely adjusted by controlling the operation range of the rotating element 9 around the horizontal axis (X).

Figure 12:
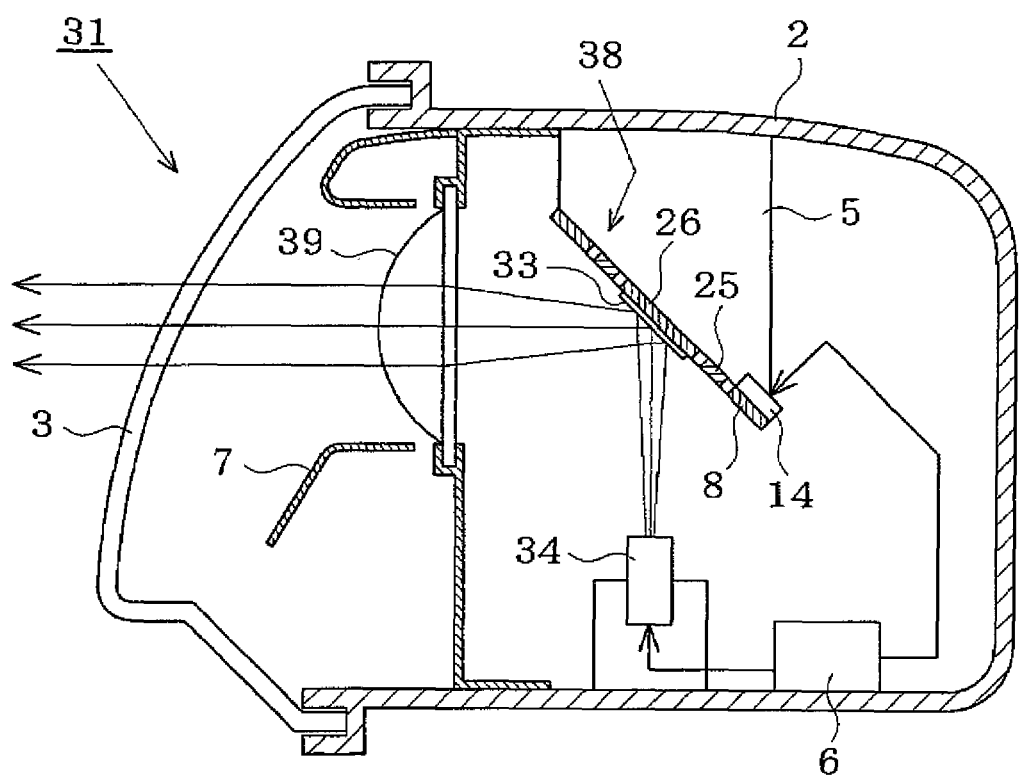
FIG. 12 is a cross-sectional view showing a vehicular headlamp including a projection lens.
Figure 13:
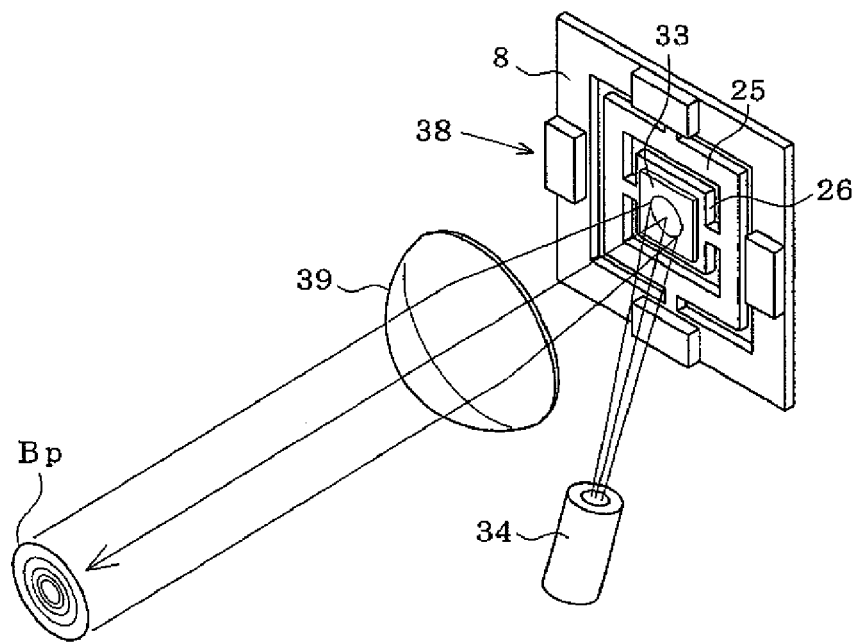
FIG. 13 shows model representations of a light distribution pattern formed through a projection lens.
Figure 13:
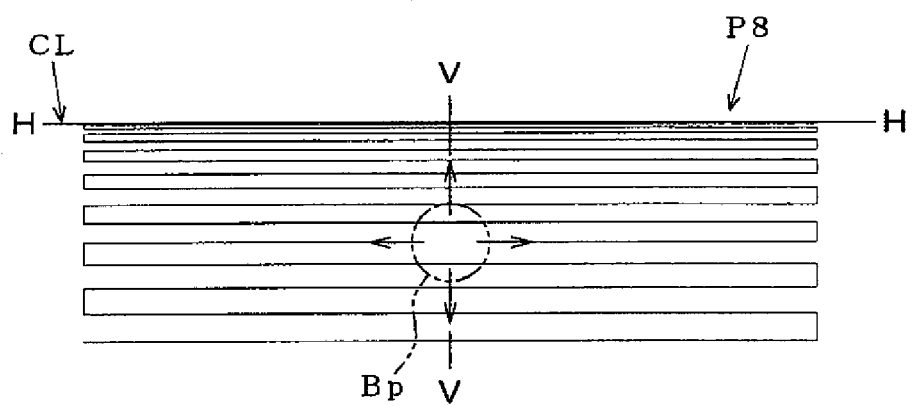

In the vehicular headlamp 31 as shown in FIG. 12, the mirror 33 is mounted on the inside rotating element 26 of the scanning actuator 38 with the two-axis driving system. A projection lens 39 is disposed forward of the mirror 33. The mirror 33 is disposed forward of focal points of the projection lens 39 and reflects non-parallel laser light incident from the light source 34 toward the projection lens 39 side. The projection lens 39 forms the reflective light of the mirror 33 into generally parallel light. As shown in FIG. 13(a), the basic pattern Bp of a sufficient size for a vehicle is formed. As shown in FIG. 13(b), when the mirror 33 reciprocatingly rotates, the basic pattern Bp is scanned at high speed in the direction of two orthogonal axes ahead of the vehicle. Accordingly, the light distribution pattern P8, which is relatively bright in the vicinity of the cut-off line CL is formed.

Figure 14:
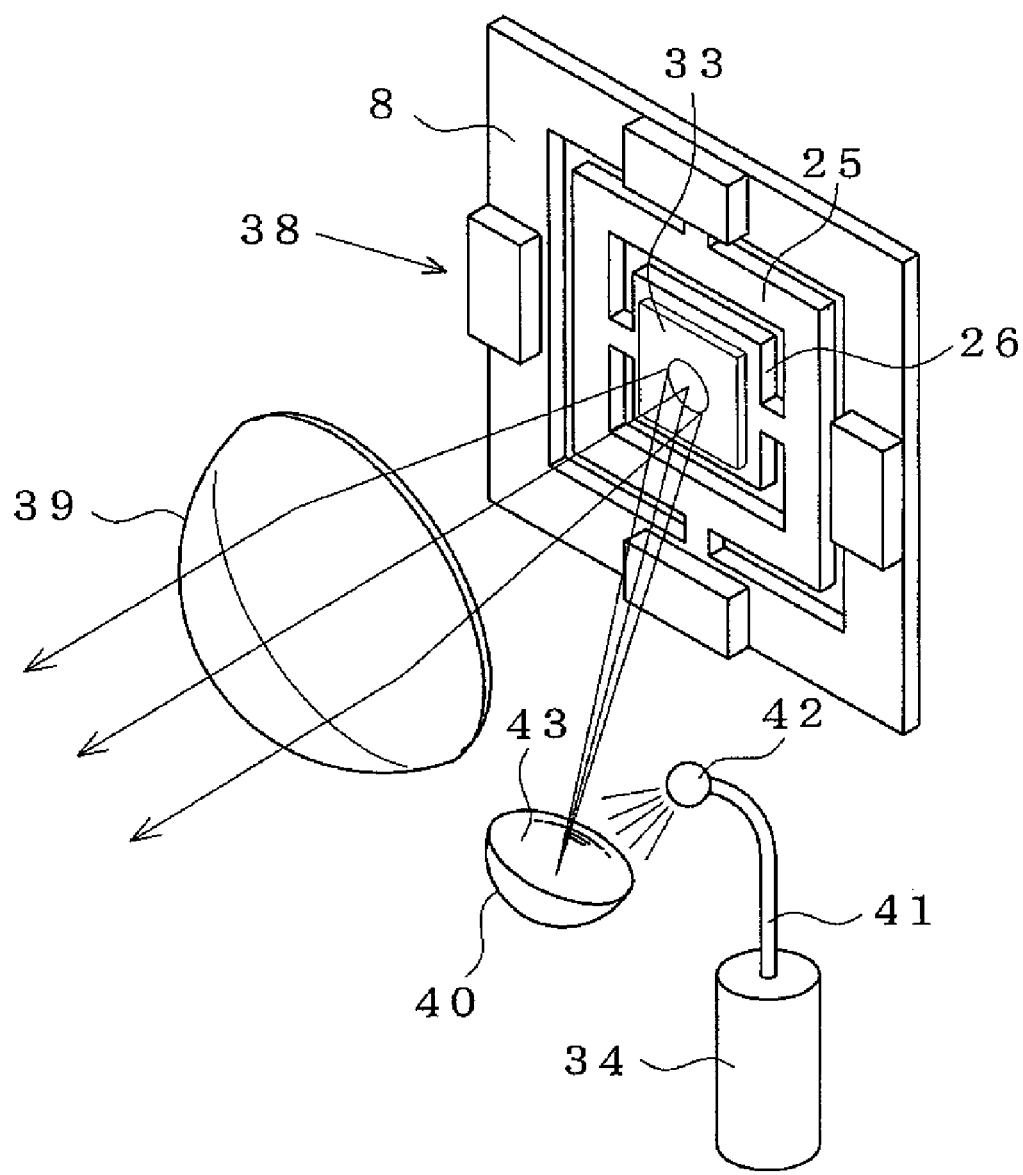
FIG. 14 is a perspective view showing a portion of a headlamp including a condenser reflective mirror.

In the vehicular headlamp shown in FIG. 14, a condenser reflective mirror 40 is combined with the light source 34. The light source 34 includes a fluorescent substance 42 on an end of an optical fiber 41 and irradiates ultraviolet laser light which is changed into white light by the fluorescent substance 42. The condenser reflective mirror 40 includes an ellipsoidal reflective surface 43 for condensing diffused light from the fluorescent substance 42. The light from the ellipsoidal reflective surface 43 is reflected by the mirror 33 toward the projection lens 39 side. In addition, parallel light from the projection lens 39 is scanned at high speed ahead of the vehicle so as to form a light distribution pattern with a difference in brightness having a required shape.

Figure 15:
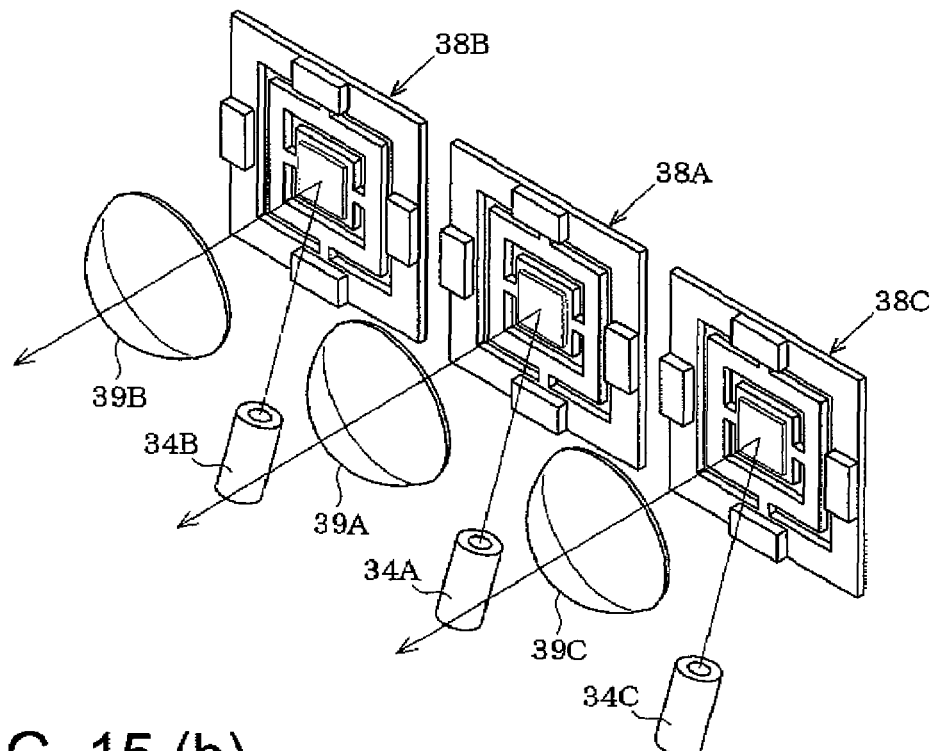
FIG. 15 shows drawings of explaining an operation of a headlamp including a plurality of actuators.
Figure 15:
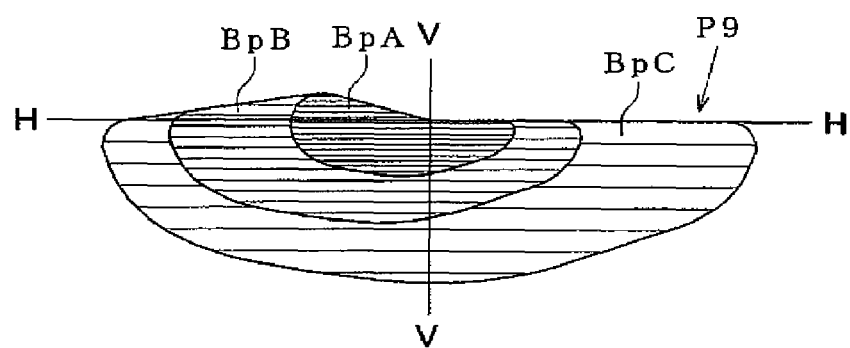
Figure 16:
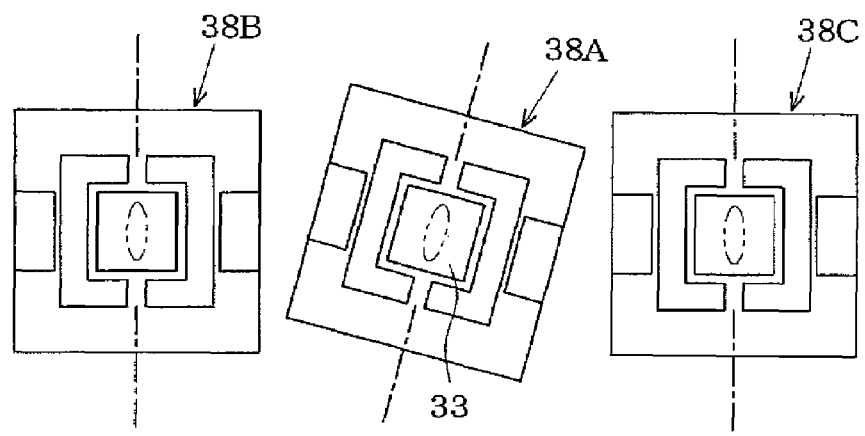
FIG. 16 shows drawings of explaining an operation of a headlamp including a tilted actuator.
Figure 16:
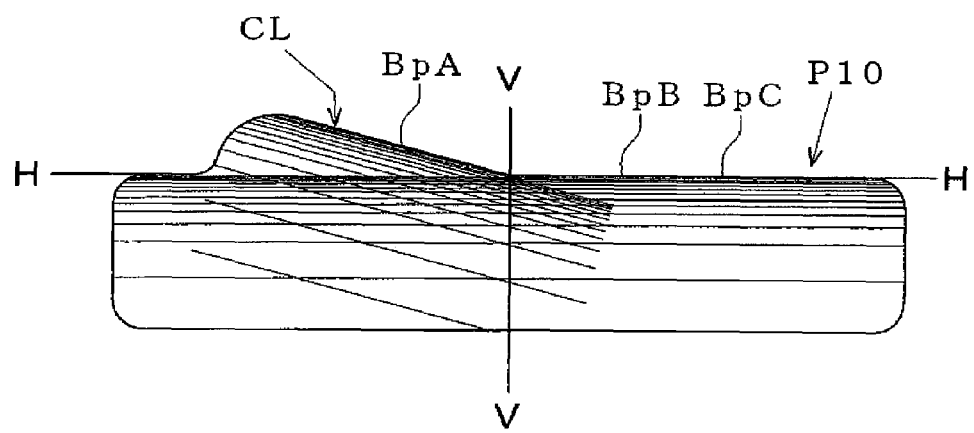

In the vehicular headlamp shown in FIG. 15, a plurality of scanning actuators 38A, 38B, 38C have a combination of light sources 34A, 34B, 34C and projection lenses 39A, 39B, 39C, respectively. The actuators 38A, 38B, 38C overlap different basic patterns ahead of the vehicle so as to form a light distribution pattern P9, which is relatively bright at the horizontally centered portion as shown in FIG. 15(b), for example. The actuator 38A forms a basic pattern BpA closer to a host vehicle lane at the center portion of the light distribution pattern P9. The actuator 38B forms a basic pattern BpB including the basic pattern BpA and extending outward therefrom. The actuator 38C forms a basic pattern BpC including the basic patterns BpA, BpB and extending therefrom. In addition, as shown in FIG. 16(a), the scanning actuator 38A of the plurality of scanning actuators is disposed at a different angle from the others. For example, according to a light distribution pattern P10 as shown in FIG. 16(b), the basic pattern BpA of the actuator 38A may form an inclined portion that is inclined 15 degrees with respect to the cut-off line CL. The basic patterns BpB, BpC of the actuators 38B, 38C may form a horizontal portion of the cut-off line CL. Note that the plurality of actuators 38A, 38B, 38C may be accommodated in one housing or disposed separated into left and right headlamps.

Third Embodiment

As shown in FIG. 17, in a vehicular headlamp 51 of a third embodiment, a plurality of light sources 52, 53, 54 are combined with one mirror 33. Light from the light sources 52 to 54 is irradiated ahead of the vehicle via the mirror 33 and the projection lens 39. A two-axis actuator is used as the scanning actuator 38. The movement (angle and speed) of the outside and inside rotating elements 25, 26 is feedback-controlled by the actuator control portion 20. The light source control portion 21 includes drive circuits 55, 56, 57. The light output (light turning-off and light control) of the light sources 52 to 54 are separately controlled and synchronized with the movement of the rotating elements 25, 26.

When the scanning actuator 38 is stopped, the light sources 52, 53, 54 forms the basic patterns with different illuminance at different regions ahead of the vehicle. For example, as shown in FIGS. 18(a) and 18(b), the first light source 52 forms a basic pattern Bp1 with high illuminance at the horizontally centered portion. The second light source 53 forms a basic pattern Bp2 with intermediate illuminance at a left side. The third light source 54 forms a basic pattern Bp3 with low illuminace at a right side. The basic patterns Bp1 to Bp3 partially overlap at the center in the horizontal direction. When the outside rotating element 25 reciprocatingly rotates, a basic pattern, which is brighter toward the center side as a whole, is scanned in the horizontal direction. Accordingly, a light distribution pattern P11, which is relatively bright in the vicinity of the horizontally centered portion, is formed ahead of the vehicle.

According to the vehicular headlamp 51 of the third embodiment the plurality of light sources 52 to 54 are combined with the mirror 33 on one scanning actuator 38. Therefore, the entire headlamp may be structured compact and at low cost using relatively few parts, and the front of the vehicle can be brightly illuminated by light from the plurality of the light sources 52 to 54. In addition, light from the light sources 52 to 54 is combined so as to form a basic pattern with illuminace distribution. Therefore, the light distribution pattern P11 can achieve a clear difference in brightness. Furthermore, the light output of the light sources 52 to 54 is separately controlled so as to enable easy adjustment of a portion or all of the illuminance of the light distribution pattern P11. The light output is controlled synchronized with the movement of the rotating elements 25, 26 such that the illuminance distribution of the light distribution pattern P11 can be changed as needed and at will. Accordingly, there is an advantage in that diverse light distribution patterns may be formed by a relatively easy control.

The present invention is not limited to the above embodiments. For example, in the vehicular headlamp 1 of the first embodiment a laser light source may be used as the light source 11. In the vehicular headlamp 31 of the second embodiment, a curved surface may be used as a reflective surface of the mirror 33. In the vehicular headlamp 51 of the third embodiment, the projection lens 39 may be omitted. The structure and shape of respective portions and the difference in brightness of the light distribution pattern may be changed as appropriate within the scope of the present invention.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS

1 VEHICULAR HEADLAMP (FIRST EMBODIMENT)
2 HOUSING
4 ONE-AXIS SCANNING ACTUATOR
6 CONTROL UNIT
9 ROTATING ELEMENT
11 LIGHT SOURCE
12 LENS
20 ACTUATOR CONTROL PORTION
21 LIGHT SOURCE CONTROL PORTION
24 TWO-AXIS ACTUATOR
25 OUTSIDE ROTATING ELEMENT
26 INSIDE ROTATING ELEMENT
31 VEHICULAR HEADLAMP (SECOND EMBODIMENT)
33 MIRROR
34 LIGHT SOURCE
39 PROJECTION LENS
40 CONDENSER REFLECTIVE MIRROR
51 VEHICULAR HEADLAMP (THIRD EMBODIMENT)
52 FIRST LIGHT SOURCE
53 SECOND LIGHT SOURCE
54 THIRD LIGHT SOURCE

What is claimed is:

1. A vehicular headlamp comprising:
a light source irradiating visible light;
a lens allowing the visible light from the light source to pass through to forward of a vehicle,
wherein the light source and the lens are mounted in a rotating element; a scanning actuator for reciprocatingly rotating the rotating element
so as to form a light distribution pattern forward of the vehicle; and
a light distribution control portion for controlling the scanning actuator such that a portion of the light distribution pattern is relatively bright.

2. A vehicular headlamp comprising:
a light source irradiating a visible light;
a mirror mounted in a rotating element and arranged to reflect the visible light from the light source to forward of a vehicle;
a scanning actuator for reciprocatingly rotating the rotating element so as to form a light distribution pattern forward of the vehicle; and
a light distribution control portion for controlling the scanning actuator such that a portion of the light distribution pattern is relatively bright.

3. The vehicular headlamp according to claim 1, wherein the light distribution control portion relatively illuminates an area near a cut-off line of the light distribution pattern.

4. The vehicular headlamp according to claim 1, wherein the light distribution control portion relatively illuminates an area near a horizontally-centered portion of the light distribution pattern.

5. The vehicular headlamp according to claim 1, wherein the light distribution control portion comprises:
an actuator control portion for controlling the scanning actuator; and
a light source control portion for controlling a light output of the light source during a stroke of the rotating element.

6. A vehicular headlamp comprising:
a plurality of light sources irradiating visible light;
a mirror mounted in a rotating element and arranged to reflect the visible light from the plurality of light sources to forward of a vehicle;
a scanning actuator for reciprocatingly rotating the rotating element so as to form a light distribution pattern forward of the vehicle; and
a light distribution control portion for controlling the scanning actuator such that a portion of the light distribution pattern is relatively bright
wherein the light distribution control portion comprises:

an actuator control portion for controlling the scanning actuator; and a light source control portion for controlling a light output of the plurality of the light sources.

7. The vehicular headlamp according to claim 2,
wherein the light distribution control portion relatively illuminates an area near a cut-off line of the light distribution pattern.

8. The vehicular headlamp according to claim 2,
wherein the light distribution control portion relatively illuminates an area near a horizontally-centered portion of the light distribution pattern.

9. The vehicular headlamp according to claim 2,
wherein the light distribution control portion comprises:
an actuator control portion for controlling the scanning actuator; and
a light source control portion for controlling a light output of the light source during a stroke of the rotating element.

10. The vehicular headlamp according to claim 3,
wherein the light distribution control portion comprises:
an actuator control portion for controlling the scanning actuator; and
a light source control portion for controlling a light output of the light source during a stroke of the rotating element.

11. The vehicular headlamp according to claim 4,
wherein the light distribution control portion comprises:
an actuator control portion for controlling the scanning actuator; and
a light source control portion for controlling a light output of the light source during a stroke of the rotating element.

12. The vehicular headlamp according to claim 6,
wherein the light distribution control portion relatively illuminates an area near a cut-off line of the light distribution patter.

13. The vehicular headlamp according to claim 6,
wherein the light distribution control portion relatively illuminates an area near a horizontally-centered portion of the light distribution pattern.

14. The vehicular headlamp according to claim 1, wherein the scanning actuator is a two-axis actuator.

15. The vehicular headlamp according to claim 2, wherein the scanning actuator is a two-axis actuator.

16. The vehicular headlamp according to claim 6, wherein the scanning actuator is a two-axis actuator.

17. The vehicular headlamp according to claim 1, wherein the light source is a light emitting diode.

18. The vehicular headlamp according to claim 2, wherein the light source is a light emitting diode.

19. The vehicular headlamp according to claim 6, wherein the plurality of light sources are a light emitting diode.

20. The vehicular headlamp according to claim 6, wherein each of the plurality of light sources is arranged to form a portion of light distribution pattern forward of the vehicle.

* * * * *